(12) United States Patent
Guidetti

(10) Patent No.: US 6,237,741 B1
(45) Date of Patent: May 29, 2001

(54) PROCESS FOR CONTROLLING THE OPERATION OF MACHINES FOR PROCESSING ARTICLES, FOR EXAMPLE FOR PACKAGING FOOD PRODUCTS, AND THE MACHINE THEREOF

(75) Inventor: Dario Guidetti, Gringnasco (IT)

(73) Assignee: Cavanna S.p.A. (IT)

( * ) Notice: Subject to any disclaimer, the term of this patent is extended or adjusted under 35 U.S.C. 154(b) by 0 days.

(21) Appl. No.: 09/266,212

(22) Filed: Mar. 10, 1999

(30) Foreign Application Priority Data

Mar. 12, 1998 (IT) .............................. TO98A0209

(51) Int. Cl.7 ................................................... B65G 1/00
(52) U.S. Cl. ........................................ 198/347.1; 198/594
(58) Field of Search ................................. 198/347.1, 594, 198/812

(56) References Cited

U.S. PATENT DOCUMENTS

| | | | |
|---|---|---|---|
| 2,932,376 | * 4/1960 | Millington | 198/594 X |
| 4,325,475 | 4/1982 | Spalding . | |
| 4,955,184 | 9/1990 | Francioni . | |
| 5,314,054 | * 5/1994 | Van Laar | 198/347.1 |
| 5,341,913 | 8/1994 | Francioni . | |
| 5,611,418 | * 3/1997 | Helmstetter | 198/347.1 |
| 5,960,927 | * 10/1999 | Bahr | 198/347.1 |

FOREIGN PATENT DOCUMENTS

| | | |
|---|---|---|
| 0 292 378 | 3/1992 | (EP) . |
| 0 709 315 | 5/1996 | (EP) . |
| 0 778 203 | 6/1997 | (EP) . |
| 0 806 308 | 11/1997 | (EP) . |
| 0 818 406 | 1/1998 | (EP) . |
| 2 124 574 | 2/1984 | (GB) . |
| 1195128 | 10/1988 | (IT) . |
| WO 97/09256 | 3/1997 | (WO) . |

OTHER PUBLICATIONS

Search Report, dated Jul. 3, 1998 (2 pages).

* cited by examiner

Primary Examiner—James R. Bidwell
(74) Attorney, Agent, or Firm—TraskBritt

(57) ABSTRACT

A process for controlling the operation of machines for processing articles includes the step of synchronously controlling the movement or speed of a feeding device and an intake branch of the machine. The process provides a method of adapting a processing machine to adjust to discontinuities in an otherwise continuous flow of articles being supplied to the machine for processing. The process provides for the speed of the feeding device and the speed of the intake branch to both be reduced simultaneously. The speed of the feeding device is slowed sufficiently that it obtains a minimum speed at the time that the perceived discontinuity reaches the interface of the feeding device and the intake branch. Simultaneously, the speed of the intake branch is reduced to a substantially standstill condition at the time that the feeding device obtains its minimum speed. The process may further provide for the standstill condition of the intake branch to be maintained until the first article, positioned after the detected discontinuity, reaches the intake branch. The process may then provide for the reactivation of the intake branch so as to bring the feeding device and the intake branch back to their normal operating conditions.

6 Claims, 3 Drawing Sheets

Figure 1:
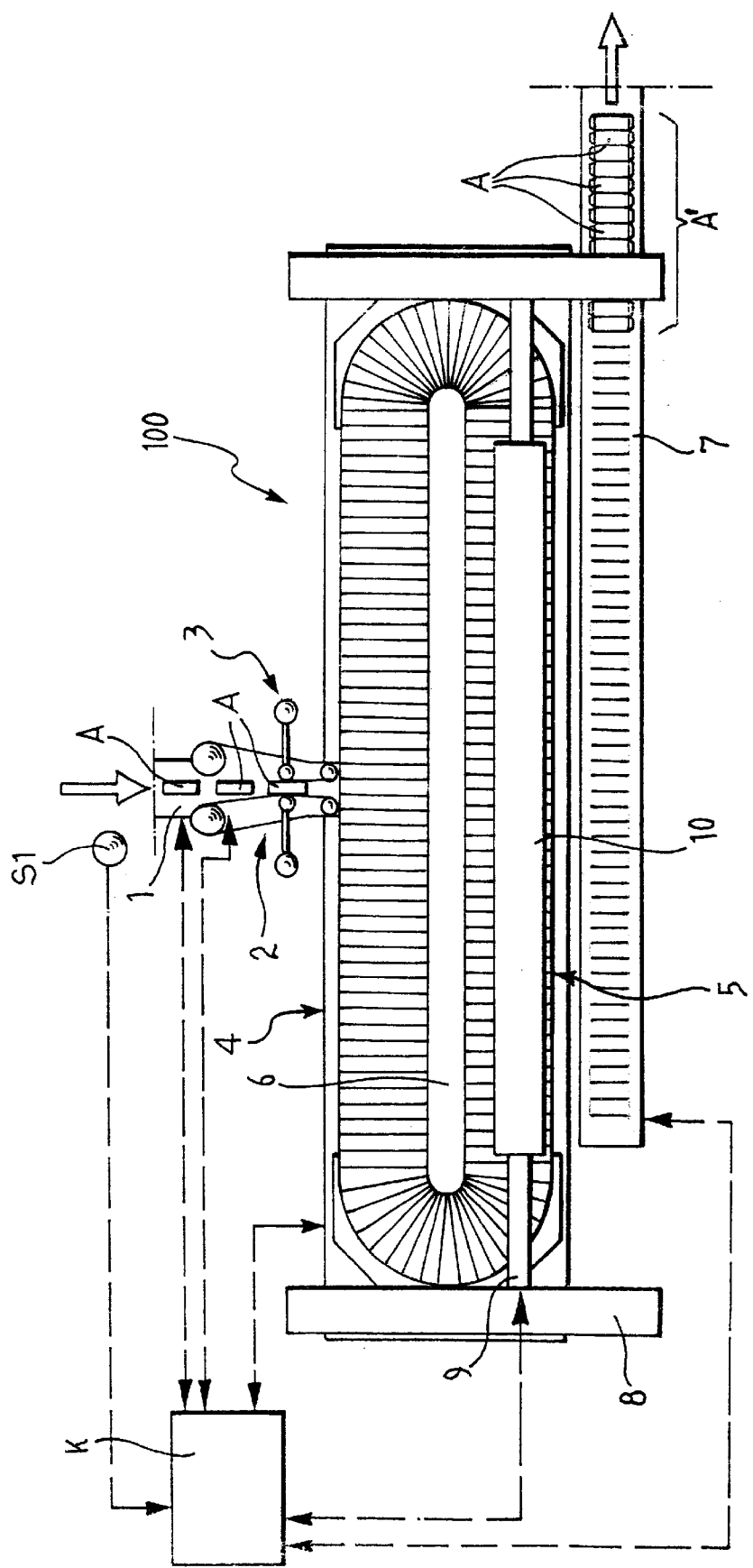

PROCESS FOR CONTROLLING THE OPERATION OF MACHINES FOR PROCESSING ARTICLES, FOR EXAMPLE FOR PACKAGING FOOD PRODUCTS, AND THE MACHINE THEREOF

SUMMARY OF THE INVENTION

The present invention relates to a process for controlling the operation of machines in accordance with the preamble of claim 1 hereinbelow, as well as the respective machine.

In developing the invention particular attention was paid to its possible application to the packaging of such food products as snacks, bars of chocolate and similar products.

STATEMENT OF THE ART

A very common practice in this application sector is the use of so-called multiple packages (sometimes referred to more briefly as "multi-packs"); these are packages in which individual articles or groups of such articles are first inserted in an appropriate individual package and then, in a subsequent phase, these individual packages are grouped into multiple packages intended to constitute—for example—units suitable for sale to families (family packs).

The packaging lines used for this purpose operate at rather high speeds and call for an ever greater degree of automation, great versatility in forming the multiple packages and the possibility of having the lines supervised by people who have not undergone any specific training; this also as regards the so-called "format change" operations.

In general (and therefore also quite independently of this specific application group) the invention sets out to solve a problem that presents itself with a certain frequency in all situations in which, starting from a substantially continuous flow of individual articles on the intake side (consisting of, for example, the individual packages to be combined into a multipack), it is desired to generate an output flow of articles that are ordered into groups or sets (in the case of multipacks, in fact, these groups would be constituted by groups of individual packages intended to be inserted into one such multipack).

In particular, this problem is bound up with the fact that the flow of articles on the intake side, which in an ideal case would be perfectly continuous, can in actual practice be associated with occasional and randomly distributed discontinuities that derive, for example, from the fact that some upstream processing station has discarded or expelled individual articles on account of having found them to badly packed, incorrectly positioned, etc. A flow of this kind can therefore be defined as "substantially" continuous.

In general principle, at least, the problem just outlined could be solved by stopping the machine that receives such an input flow for a period of time sufficiently long to cause the discontinuity to be absorbed, which in actual practice means that the receiving machine has to be stopped for the exact period of time in which it would have received the missing article. In actual fact, however, this solution is not practicable for a whole series of reasons, though first and foremost on account of the high operating speeds of the machines under consideration, which make it practically impossible to obtain the almost instantaneous stoppage and restarting that would be needed to implement this type of solution.

The present invention therefore sets out to provide a solution of this problem wholly compatible with the high operating speed of the machines under consideration and also such as to preserve unaltered, always within the ambit of a simple and reliable machine, the characteristic of considerable versatility as regards the composition of the groups of articles on the output side and the realization of format changes in a fully automatic manner.

According to the present invention, this scope can be attained thanks to a process having the characteristics set out specifically in the claims hereinbelow. The invention also includes the machine with which this scope can be attained.

The invention will now be described, though only by way of an example not to be considered as limitative in any manner or wise, by reference to the drawings attached hereto, where:

BRIEF DESCRIPTION OF THE INVENTION

Figure 2:
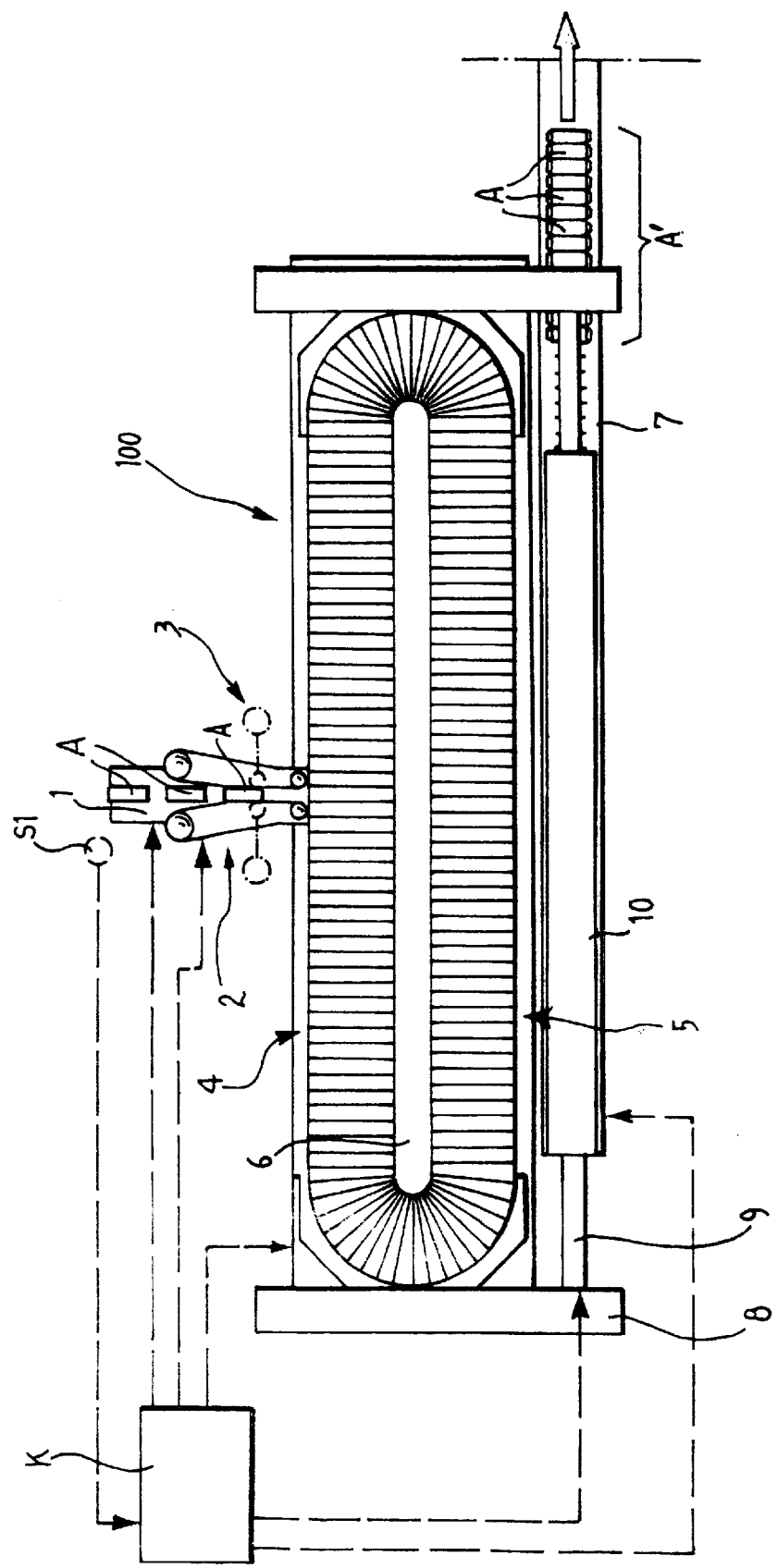
Figure 3:
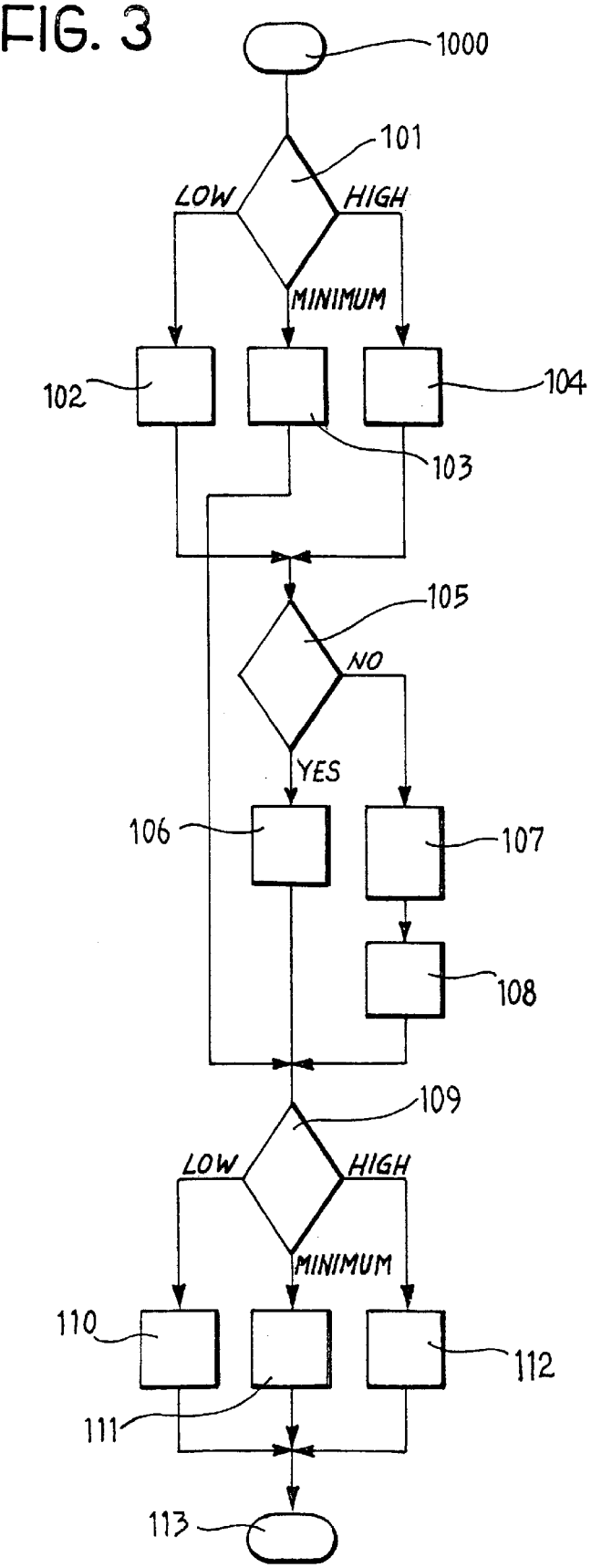

FIGS. 1 and 2 are two schematic plan views of a machine in accordance with the invention, which they show in two different operating conditions, and FIG. 3 shows a flow diagram that illustrates the implementation of the solution according to the invention in the machine shown in FIGS. 1 and 2.

DETAILED DESCRIPTION OF THE ILLUSTRATED EMBODIMENTS

The reference number 100 in FIGS. 1 and 2 indicates the whole of a packaging machine that can be used, inter alia, for the automatic packaging of food products.

With a view to clarifying ideas (but always within the ambit of a presentation that is intended to be no more than an example), one may think of the machine 100 as being intended to receive as input a flow of articles A consisting of individual packages of such products as, for example, snacks, bars of chocolate, etc., and to generate on the output side a flow in which the said articles A are arranged into distinct groups. Each group A' consists of a certain set of articles A intended to be inserted into, for example, a multiple package of the type commonly referred to as a "multipack".

It should also be noted that in FIGS. 1 and 2 the articles A (and the groups A' formed from them) have been shown only in the positions that correspond, respectively, to the intake and output sides of the machine 100, thus avoiding the unduly cumbersome figure that would be obtained if it were to show the articles A also in the various intermediate positions, which can in any case be readily deduced by even a cursory examination of the drawing.

In particular, it will here be supposed that the incoming flow of articles A (which has the characteristics of a substantially continuous flow, that is to say, a continuous flow that may yet contain some accidental discontinuities as previously discussed hereinabove) comes from an individual packaging machine of known type (for example, of the type currently known as a "Form-Fill-Seal" machine or, more briefly, "FFS" or "Flow-Pack" machine).

Precisely on account of being so well known, the machine in question is not shown on the drawings, with the sole exception of its output conveyor (belt), which is indicated by the reference number 1. For the same reasons the drawings do not show the multiple packaging machine that acts on the groups of articles A' downstream of the machine 100.

In the specific implementation example here illustrated—and which is no more than such—the machine 100 is realized as a set of operational elements that are all individually known as such. Hereinbelow, therefore, only the essential features of these elements will be described, though making repeated reference to previous patent documents for a more complete and detailed description of their structure and mode of operation.

This applies particularly as regards the lateral belt system 2 that realizes the 90° transfer of the incoming articles A, transferring them lengthwise and then moving them sideways on the intake branch (4), complete with the oscillation system combined with these belts that is controlled by means of a cam device and is here indicated overall by the reference number 3. A more complete description of these elements can be found in Italian patent IT-B-1 195 128 assigned to the same assignee of the present application.

The transfer unit 2, 3 causes the articles A to pass onto a transfer and accumulation device having the general structure of a merry-go-round (roundabout). Devices of this type are well known to the state of the art (see, for example EP-B-0 292 378) and their primary element consists of a belt (or chain) forming a closed loop around two return shafts or rollers (on a vertical axis, in the example here shown) and provided externally with blades or baffles, each pair of which defines a bed, a bed for receiving and transporting the articles A. The belt in question is arranged in such a way to exhibit an intake branch 4 for receiving the articles A positioned perpendicularly with respect to the incoming flow of the articles as well as an output branch or tract 5 located at the opposite side of the device. The structure supporting the belt provided with blades, designated 6 overall, carries respective motor means (not shown) which enable:

a general forward movement or sliding of the bladed belt with respect to the return rollers on which it is arranged, and the overall to and fro motion of the supporting structure 6 in the direction in which the intake branch 4 and the output branch 5 of the device are arranged.

The combination the two motions described above makes it possible, at least temporarily, to render the motion of the output branch 5 independent of that of the intake branch 4. More particularly, the output branch can be brought momentarily to a halt (for example, during the interval of time required to remove a group of articles A from this branch) while the intake branch 4 continues its motion—preferably in a continuous (rather than a step-by-step) manner—with respect to the feed device (2, 3 in the example here illustrated) as a result of the movement of the structure 6. Even when the output branch 5 is in a condition of momentary standstill, it is thus able to offer to the feed device 2, 3 new reception beds for the articles A and these beds continue to arrive at the intake end and accumulate on the merry-go-round structure of the device. When the output branch 5 resumes its motion, the structure 6 can therefore move again (usually in the direction opposite to the one in which it moves to constitute the "buffer" of articles A while the output branch 5 is momentarily halted) to make up the lag it has accumulated during the standstill of the output branch and make available on the said output branch a new lot of articles for subsequent collection.

It will also be appreciated from what has been said above that the previously described elements 2 and 3 make it possible to impress upon the downstream or distal end of the conveyor 1 a cyclic motion of following the intake branch 4 of the transfer and accumulation device 4, 5 and 6.

As has already been pointed out, the specific operating criteria of a device of this kind have to be considered as well known to the state of the art and such as not to call for a detailed description as part of the present application, not least because they are not in themselves relevant for the purposes of understanding the invention.

Lastly, the reference number 7 indicates the input conveyor of the handling station situated downstream of the machine 100. In the case of the implementation example here illustrated, the said downstream station could consist, for example, of a packaging machine for the formation of multiple packs complete with automatic devices for grouping the products moving forward on the conveyor 7. In this connection it may be helpful to refer to Italian patent IT-B-1 232 579 (which has its United States counterpart in U.S. Pat. No. 4,955,184) and to Italian patent application TO96A000579, both assigned to the same assignee.

The reference numbers 8, 9 and 10 indicate the various component parts of a robot that serves to transfer the groups of articles A' from the output branch 5 of the merry-go-round device 4, 5 and 6 to the conveyor belt 7.

More specifically, reference number 8 indicates the supporting structure of the robot for collecting and redepositing the articles A. On the structure 8 there is mounted the sliding trolley 9, which—under the action of motor devices not shown on the drawings—is capable of performing an alternating motion between:

a position for collecting the articles A, which is illustrated in FIG. 1, where the trolley 9 is situated in a position above the output branch 5 of the merry-go-round device, and a position for depositing the said articles, which is illustrated in FIG. 2, where the trolley 9 is situated in a position above the conveyor 7.

The reference number 10 specifically indicates the multiple collection head (of a known type) mounted on the trolley 9 and configured in such a way as to be capable of being lowered with respect to the output branch 5 in order to collect the articles A situated thereon and then being raised with respect to the trolley 9, which then moves towards the conveyor 7, where the head is lowered again to deposit the articles A on the said conveyor 7, subsequently to be raised again while the trolley 9 moves back towards the collection position above the output branch 5 of the device 6.

The various mobile organs of the machine 100 are all operated by appropriate motor elements that are not show on the drawings. The motor elements in question are controlled in a coordinated manner by a processing unit K that may consist, for example, of a so-called PLC (acronym of Programmable Logic Controller) or some similar processing unit. The connection, which may be bidirectional, and therefore also in the sense of an enslavement of the various elements (the principal ones being: the conveyor and packaging machine 1; the oscillating system 2, 3; the merry-go-round device 4, 5 and 6; the conveyor 7; the collection robot 8, 9 and 10) to the unit K, has here been represented in a schematic manner by means of dotted lines that link the unit K to the various mobile elements in question. The specific criteria that can be adopted for the realization of such a control system and for programming its operation constitute a design task within the capacity of a technician expert in this field once the specific intervention and synchronization modalities to be described in detail hereinbelow have been defined.

Control of the various motor elements included in the machine 100 and—whenever appropriate—of the organs associated with them usually presupposes that information about the flow of the articles A upstream and downstream of the machine is supplied by appropriate sensor elements. These sensor elements, once again of a known type, have not been shown in a specific manner on the drawings, because they are deemed to be included in the parts or devices of which they form part.

Nevertheless, the drawings contain specific indication of the presence of a sensor S1 arranged on the conveyor 1 in a position that can generically be described as upstream (usually at a distance equal to several of the articles A to be handled) and intended to provide the unit K with information about the possible lack of an article A among those about to arrive on the conveyor 1.

Description of the Operation of the Machine 100

Reduced to essential terms, the operation of the machine 100 is based on the following general principles:

- the intake branch 4 of the merry-go-round device 6 is a follower of the input conveyor 1, the follow-up link being—for example—of the type currently known as an "electrical axis", and therefore presents to the conveyor 1 a new bed capable of receiving an article A every time such an article arrives on the said conveyor 1,
- the lateral conveyor belts 2 controlled by the cams make it possible for articles A to be inserted into the beds of the intake branch 4 which arrive at the intake station with a substantially continuous motion, and
- the output branch 5 of the device 6 moves with a substantially continuous motion linked with the intake branch 4 and then comes to a standstill periodically for the time necessary for group of articles A' to be collected by the collection head 10, after which it makes up the lost ground.

With this end in view, the sensor S1 detects the presence of the articles A on the conveyor 1; it does so preferably a reasonable period of time before the articles A are loaded onto the device 6, that is to say, in a position corresponding to several cycles before the particular article A actually enters its bed.

In normal conditions the speed of the input conveyor 1 (and as a general rule also of the packaging machine of which it forms part) is controlled by a system (not shown on the drawings) capable of detecting an accumulation of articles on their feed belts and therefore of piloting the increase or decrease of the speed at least between two predetermined thresholds.

The output branch 5 of the device 6 moves with a continuous motion and, after having moved forward through n positions, which correspond to a number n of articles A to be collected in a single operation by the collection head 10 (where n is the number of articles included in each group A'), comes to a standstill in a position suitable for expecting the articles to be collected. After the articles have been collected, the output branch 5 again follows the intake branch 4 until the next collection.

When the sensor S1 detects the lack of an article A in the input flow on the conveyor 1, the unit K intervenes to impose a speed reduction of the input conveyor 1 (and the packaging machine of which it forms part) in such a way as to make it possible to halt or at least to slow down very considerably (and therefore to bring into a position of substantial standstill) the continuous movement of the intake branch 4 of the device 6. In this way the intake branch 4 "misses" or, better, "awaits" the virtual feed, by conveyor 1, of the missing article A onto the said intake branch 4.

Thanks to the particular location of the sensor S1, the machine 100 knows that an article A is missing in the input flow some time before the lack of this article can produce the effect of leaving a bed of the intake branch 4 devoid of a load. In these conditions, both the conveyor 1 and the intake branch 4 will commence a gradual reduction of their speed, while articles A continue to be fed towards the device 6, though now at a minimum value of the speed. When the system arrives in the position in which the missing article A would have to be virtually loaded, i.e. when the discontinuity in the article flow reaches the intake branch 4, the said intake branch 4 is brought to a standstill or a substantial standstill (where both these conditions are included in the diction "condition of substantial standstill" used in the claims appended hereto), while the conveyor 1 continues to move forward—at a reduced speed—through the distance that corresponds to the missing article A. At this point, i.e. when—following the discontinuity in the flow on the conveyor 1—a new article A becomes available for being loaded onto the device 6, the intake branch 4 is set into motion again and thus enabled to receive the said available article A into its first free bed, while the speeds (which are linked to each other) of the conveyor 1 and the intake branch 4 are gradually increased to their normal values. The forced temporary reduction (intended to make it possible for the intake branch 4 to be brought to a substantial standstill) of the speed of the packaging machine of which the conveyor 1 forms part will generally cause an increase in the number of articles that accumulate on the feed system. At the end of this forced reduction, therefore, the operating speed of the packaging machine is usually set to increase again (in the manner described hereinabove) to the level it should have at that particular moment, thus enabling it to dispose of the articles that have accumulated at the intake.

The described operating mode thus makes it possible to reduce the speed of the packaging machine (conveyor 1) to a level at which it will become possible for the intake branch 4 of the device 6 to be brought to a substantial standstill and subsequently set it into motion again without creating any problems of a mechanical nature and/or problems in handling the articles A, problems that would however arise if an attempt were made to implement the previously described waiting or stoppage function while the machine 100 is operating at its normal speed.

The previously described operating criteria can be understood even better by reference to the flow diagramme shown in FIG. 3.

The step 1000 in the said flow diagramme generally indicates a starting phase, while the step 101 essentially represents a choice connected with the determination of the quantity of articles that are being accumulated on the packaging machine of which the conveyor 1 constitutes the output conveyor. The choice step 101 offers three possible outputs according to whether the accumulation level is defined as "low", "minimum" or "high". This choice is usually made in terms of specific thresholds that are determined—where appropriate also selectively by the operator—in the light of the specific operating needs of the system.

The three possible choice steps 101 have their counterparts in three steps that are schematically represented by, respectively, the three blocks 102, 103 and 104.

The step 102 corresponds to a reduction of the speed of the packaging machine (and therefore also of the conveyor 1) intended to compensate a low accumulation level.

The step 103 corresponds to the packaging machine being brought to a standstill to take account of the fact that the accumulation level has attained its minimum permissible level.

The step 104, on the other hand, corresponds to an increase of the speed of the packaging machine to take account of a high accumulation level (such as the one that may pertain immediately after the phase in which a low operating speed has been imposed).

The steps 102 and 104 come together in a further choice step 105 of which the outcome is essentially determined by the signal arriving from the sensor S1. Indeed, the step 105 verifies whether the flow of articles A on the conveyor 1 is continuous or suffers from a solution of continuity.

In the case of normal operation (i.e. continuous flow and therefore positive outcome of step 105) the flow diagramme continues with step 106, which represents the control function of the device 6 in a synthetic manner.

But when the step 105 identifies a solution of continuity in the incoming flow of articles A, the flow diagramme continues with a step 107, which first imposes the previously described slowdown on the conveyor 1 and then, in a subsequent step 108, brings the intake branch 4 of the device 6 to a substantial standstill (intermittent operation of the merry-go-round device 6).

Both the step 106 and the step 108 (as also the step 103) then come together again in yet another choice step 109 that essentially corresponds to the detection of the number of articles A that have accumulated on the active tract of the merry-go-round device 6. In practice this is the number of articles included between the loading or intake position where the system 2, 3 performs its function and the collection position where the collection head 10 does its work.

In this case, once again, there are three possible outcomes of the operation that correspond, respectively, to a "low" value, a "minimum" value and a "high value", all three values being usually defined selectively in the light of the operating parameters of the system.

These three outcomes have their counterparts in three distinct steps, indicated in the diagramme by the blocks 110, 111 and 112, that correspond, respectively, to a reduction, the complete annullment (bringing to a standstill) and an increase of the translation speed of the structure of the device 6, i.e. the speed that determines the formation of the accumulation in the previously described terms. In this connection it should be recalled that the movement of the output branch 5 is essentially a follow-up motion of the movement of the conveyor 7 that feeds the station on its downstream side.

The step indicated by the number 113 is a nominal stoppage step that in practice corresponds to the cyclic repetition of the flow diagramme, starting once again with the choice step 101, in accordance with the typical modalities of such automatic control processes.

The general principle of the invention, of course, makes it possible for the realization details and the implementation forms to be very extensively varied with respect to what has here been described and illustrated without in any way going beyond the limits of the present invention.

For example, the solution illustrated by the drawings makes reference to a solution in which the machine fed by the conveyor 7 is essentially intended to realize a single-layer multipack. In this case, therefore, all the articles A are unloaded at the lowest level of the feed conveyor of the said machine. But in the case in which the said machine has to realize a double-layer multipack, the unloading device 8, 9, 10 can be modified in such a way as to unload the first half of the articles A at the lower level and the second half of the previously loaded articles A at the upper level, thus forming the double-layer pack. The conveyor 7 may be advantageously associated with a system that makes it possible, seeing that all the beds making up its feed chain are occupied, to group the desired quantity of articles directly into the packaging material of the machine on the downstream side. Systems of this kind can operate either by alternatively stopping the product flow every time a predetermined number is reached (see, for example, the solution described in the Italian patent IT-B-1 232 579 and its United States counterpart U.S. Pat. No. 4,955,184, both assigned to the same assignee) or by pushing the articles A tightly against each other (see, for example, co-pending application U.S. Ser. No. 883879 filed Jun. 27, 1997), as also by mixed systems based on both stopping and pushing.

It also follows quite clearly the description given hereinabove that the solution according to the invention permits an individual packaging machine (whose output conveyor is represented by the conveyor 1 shown on the drawings) to be automatically connected in cascade with a multiple packaging machine (whose input conveyor is represented by the conveyor 7 shown on the drawings) and thus makes it possible to absorb any discontinuities of the input flow and/or change the number (n) of articles A contained in the multiple pack by simply calling the appropriate program via the keyboard controlling the unit K. All this can be done while maintaining a constant positive control of the articles A, which in practice means keeping the articles A separate from each other and thus avoiding the intrinsic difficulties of the known solutions in which the absorption of discontinuities in the input flow presupposes the formation of "buffers" of articles pushed up tight against each other and which therefore have to be separated (or "unscrambled") for the purposes of being fed to the machine situated on the downstream side.

It will also be appreciated that the passage of the articles A from the set of elements 1, 2 and 3 to the intake branch 4 may be either direct, as is the case in the example here illustrated, or mediated by, for example, an auxiliary merry-go-round structure synchronized with the conveyor 1 (and therefore to all intents and purposes integrated into the feed system that moves the articles A towards the intake branch 4) and yet capable of realizing a spatial orientation of the incoming article flow. Such a solution may prove useful, for example, when the layout constraints of the plant are such as to exclude the conveyor 1 being arranged in an orthogonal position with respect to the conveyor 7. The aforesaid auxiliary merry-go-round structure (which is not shown on the drawings) may consist, for example, of a rotating platform that receives the articles A between baffles that converge towards the centre of the platform, with an overall effect of improving the reception of the articles A. For the purposes of the previous description of the operation of the machine 100, the said auxiliary merry-go-round structure may to all intents and purposes be regarded as a part merged with the conveyor 1. In this case, therefore, the absorption of the discontinuity in the input flow takes place at the level of the passage of the articles A from the auxiliary merry-go-round structure to the intake branch 4.

It is equally clear that the set of parts 8, 9 and 10 may be replaced quite simply by a direct passage of the articles A carried in the beds of the output branch 5 of the device 6 to the conveyor 7 moving in a plane at a lower level, with the interposition of an idle plate over which the articles A move or slide and at the end of which they pass from the beds onto the conveyor at the lower level without any solution of continuity and at very low linear speeds. The control of the multiple packaging machine 7 situated on the downstream side is piloted from the position of the circuit of the merry-go-round device and the intake branch of the device 6 is generally made subservient by means of an electrical axis mechanism linked to the supply of the packaging machine. Any necessary superposition of the articles A to obtain packages consisting of two or more layers can be implemented, for example, by installing in the multiple packaging machine the solution described in Italian patent IT-B-1 249 951 and its United States counterpart U.S. Pat.

No. 5,341,913, both assigned to the same assignee of the present application. This solution may be adopted, inter alia, for articles A that do not readily lend themselves to being collected (by suction, for example) by the collection head of a handling device.

What is claimed is:

1. A process for controlling the operation of a machine for processing articles, said machine including a device for transferring and accumulating said article, said device being provided with:

a feeding device for feeding a substantially continuous flow of said articles to an intake branch of the said device, an output branch with associated structure for collecting said articles in groups, each said group having a previously selected number of said articles, and a mobile structure for selectively varying the length of said transfer and accumulation device included between the said feeding device and said output branch, said process comprising:

detecting in the said substantially continuous flow the possible presence of discontinuities corresponding to articles that are missing in the flow, controlling the movement of the said feeding device and said intake branch in a synchronized manner and, whenever a discontinuity is detected in said substantially continuous flow, causing the speed of the said feeding device and, consequently also of said intake branch to become reduced towards a minimum value that is attained when the said discontinuity actually reaches said intake branch, bringing the said intake branch into a condition of substantial standstill when said minimum value of the speed is attained, maintaining said condition of substantial standstill until the machine reaches the condition in which the first article in the said flow after said discontinuity actually reaches said intake branch, and setting said intake branch into motion again and thus bringing said feeding device and said intake branch into their normal operating conditions.

2. The process of claim 1, further including an operation of monitoring the accumulation of the said articles upstream of the said feeding means, reducing or increasing the operating speed of the said feeding means whenever the number of articles accumulated upstream of the said input conveyor, respectively, diminishes or increases.

3. The process of claim 1, further including the operations of:

activating the said collection means to collect groups of the said articles from the said output branch while the said output branch is in a condition of substantial standstill, and moving the said mobile structure in such a manner as to gradually increase the length the said transfer and accumulation device included between the said intake branch and the said feeding means and the said output branch for at least as long as the said output branch remains in a condition of substantial standstill.

4. The process of claim 1, including the operation of imposing on the distal end of the said feeding means a cyclic movement of following the intake branch of the said transfer and accumulation device.

5. The process of claim 1, including the operation of moving the said intake branch, whenever it is moving, with a continuous motion.

6. A machine for processing articles comprising:

a feeding device for a substantially continuous flow of said articles;

a collection device for collecting said articles in groups, of said groups having a previously selected number of articles;

a transferring and accumulating device interposed between said feeding device and said collection device, said transferring and accumulating device being adapted for transferring and accumulating said articles, said transferring and accumulating device including:

an intake branch capable of receiving said articles from said feeding device, an output branch capable of receiving articles to be collected by said collection device, a mobile structure to selectively vary the length of said transfer and accumulation device included between said feeding device and said collection device;

a detection device for detecting in the said substantially continuous flow, a possible presence of discontinuities corresponding to articles that are missing the flow;

a control device for controlling the movement of said feeding device and said intake branch in a synchronized manner such that whenever a discontinuity is detected in the said substantially continuous flow, said control device causes a speed of said feeding device and also said intake branch to be reduced towards a minimum value that is attained when the discontinuity reaches said intake branch, said control device being arranged to:

bring said intake branch into a condition of substantial standstill when said minimum value of said speed is attained and thereafter maintaining said condition substantial standstill until machine reaches a condition in which said first article in said flow after said discontinuity actually reaches said intake branch; and set said intake branch into motion again thus bringing said feeding device and said intake branch to their normal operating conditions so that said intake branch is adapted to be brought into a condition of substantial standstill to absorb any discontinuities that may be present in said substantially continuous flow, said transfer and accumulation device realizing a positive control action of said articles.

* * * * *